July 8, 1969
R. F. PETERSON
3,454,120
COMPACT WEIGHER AND POSTAGE COMPUTER WITH
SELECTABLE-FULCRUM BEAM
Filed Aug. 26, 1968
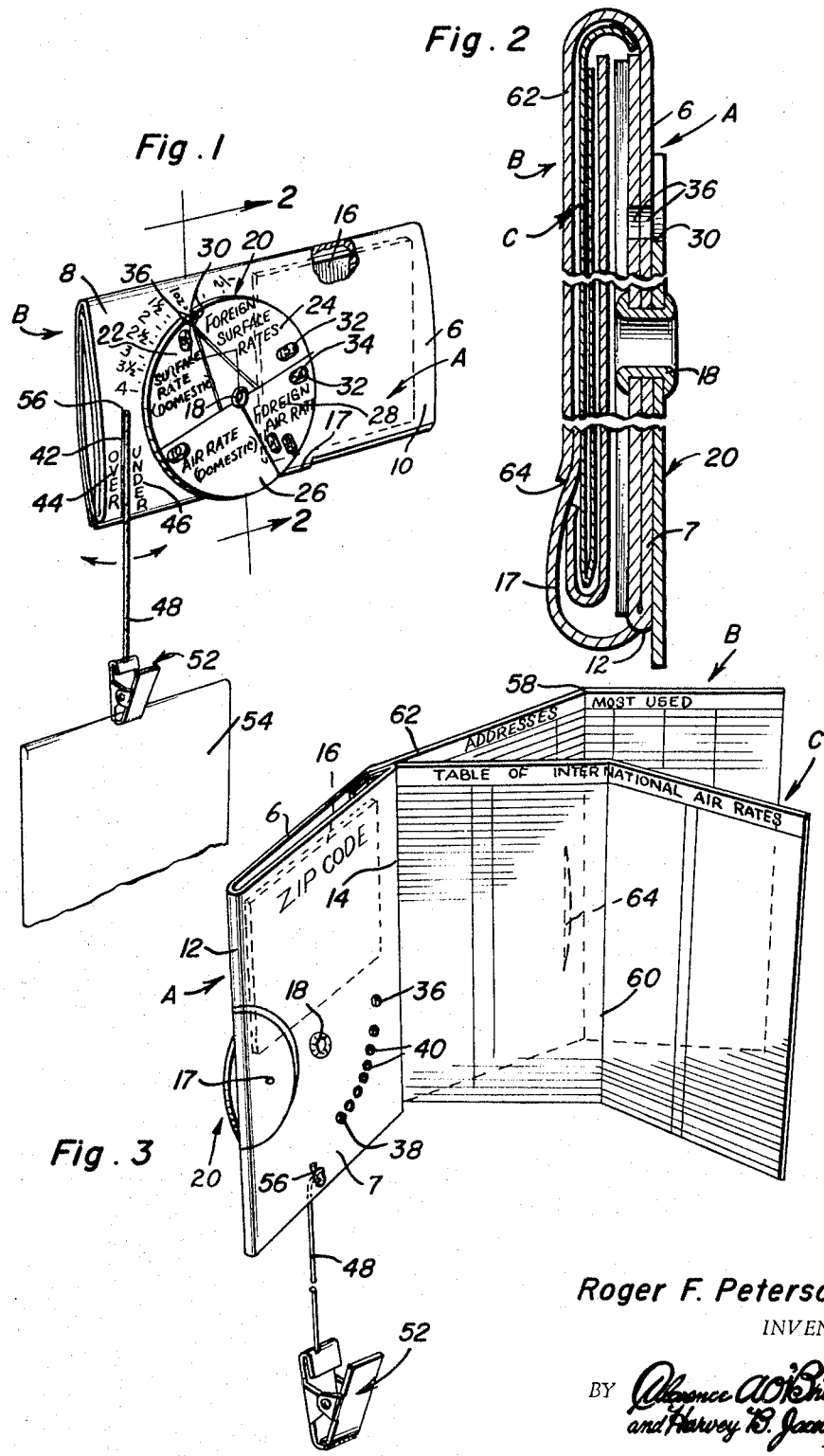
Roger F. Peterson
INVENTOR.

United States Patent Office 3,454,120
Patented July 8, 1969

3,454,120
COMPACT WEIGHER AND POSTAGE COMPUTER WITH SELECTABLE-FULCRUM BEAM
Roger F. Peterson, 6303 South St.,
Lincoln, Nebr. 68506
Filed Aug. 26, 1968, Ser. No. 755,152
Int. Cl. G01g 21/00
U.S. Cl. 177—126          10 Claims

ABSTRACT OF THE DISCLOSURE

A letter weighing and postage computing scale is offered for on-the-spot pocket and handbag use. It can be made from cardboard, paper or plastic sheet material and is foldable into compact and convenient form. It is characterized by coordinating panel members, the main or front one of which is provided at one end portion with a built-in counterweight and at the other end portion by an index or indicator mark having complemental indicia and a calibrated weighing scale with which an adjustable calculating dial is cooperable. This dial provides rate viewing windows and other features hereinafter set forth.

---

This invention relates to certain new and useful improvements in a self-contained ready-to-use innovation through the medium of which a postal patron can, without the aid of conventional table-type or equivalent weighing machines, ascertain the proper postage required for domestic and foreign letters. This unique adaptation will enable a user to accurately and reliably compute the needed postage and will comply with the ordinary every day requirements for letter weighing from one half ounce to four ounces and will, generally construed, serve the primary purposes for which it has been designed.

Mail carriers and persons conversant with the particular field of endeavor under advisement have repeatedly noted that a widespread problem has to do with ascertaining whether a letter about to be deposited in a mailbox has sufficient postage. Time and again extra stamps are attached just to be sure when, as a matter of fact, they are really not necessary. Letters transmitted to foreign countries frequently are returned for additional postage because the sender did not know or take time out to determine the weight and postage requirements. An object of the instant endeavor is to aptly cope with and acceptably solve the problem above touched upon.

Briefly the innovation herein shown and comprehended has to do with a portable pocket-size letter suspending weighing and postage computing device wherein a major portion or part thereof is made up of cardboard, plastic or equivalent rectangular panels which are superimposed and fastened together to provide a component which is hereinafter set forth as an elongated jacket. More explicitly this jacket is characterized by a first rectangular panel which normally functions as a front panel and a companion or second panel which is opposed to and complemental with the first panel and is referred to either as a rear panel or a backing panel for the front panel. This jacket is to be construed as providing a left half-portion and a right half-portion, the right half-portion having a counterweight. This counterweight is interposed or sandwiched and fastened between the coacting end portions of the two panels. The left hand half-portion has a prominent straight marker line which is referred to as a tilt indicating marker and is located in a lower left hand corner portion of the left hand half-portion. This marker functions as a significant factor in that the word "over" is located to the left thereof while the opposite word "under" is located to the right thereof. Pendulous means is provided and characterized by a flexible suspension element or cord whose upper end is anchored on the two panels and has its point of anchorage directly in line with the indicating marker. A median portion of the cord is capable of assuming a first position which is registrable with the indicating marker and while the jacket which functions as a balance or beam angles itself the cord with its clip and attached letter comes into play and coacts with either of the aforementioned designations to assist in achieving the desired end result; that is, wherein a manually positionable calculating dial serves in conjunction with a supporting pencil, ball point pen or the like in cooperation with a graduated or calibrated weighing scale. To the ends desired, the dial is provided with requisite self-explanatory descriptive matter and is further provided with segments or sectors each having a sight opening or window which enables the user to uncover the required and correct postage applicable to regular domestic or foreign rates or, alternatively, domestic or foreign air rates.

The herein disclosed first class postage computer features, in part, a graduated and marked scale embodying properly graduated apertures or holes and is made so that if a two ounce weight is attached to the letter clip the string or cord will hang directly and in line with the aforementioned marker. The same would be true of other ounce markings. In order to make the computer pocket size and to have enough weight on the so-called beam end, it is necessary to embody a suitable weight which in the instant situation comprises a sheet or piece of metal which is glued or otherwise arranged between the two main panels of the jacket and which is confined to the normal right hand half-portion. The invention features a novelly printed dial which is provided with a triangulate component which serves as the desired point of support. The apical end of this triangular zone is lined up with a keeper notch in the periphery of the disk-like dial and the notch serves to seat the point of a pencil or ball point pen or the like which is in turn selectively seated in one of the scale openings or holes to permit the over-all device to be suspended and to tilt in a manner to bring the aforementioned sight openings or windows into play, whereby to furnish the postage information needed for on-the-spot mailing purposes.

In addition to the dual panel jacket the front panel of the jacket carries and is provided with an outside and an inside folder. Each folder is made up of two folds which can be folded together. The inner surfaces or faces of these folders are provided with columnized lines so that the outside folder can be used more or less as a blank form to reveal the addresses that are most often used by the owner. The inside folder which is preferably made of light paper is also lined and columnized and has alphabetical information giving the names of countries and also indicating the postage rates in cents thus providing a ready reference table or chart which is particularly usable as a table of international air rates and which if desired may provide other information relative to foreign and domestic postages requirements.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIG. 1 is a view in perspective which shows the collapsed ready-to-use pocket size letter suspending weighing and postage computing device, shows the pendulum-like clip-equipped cord with a letter attached, shows the position and manner of use of the dial and shows the upper left hand corner portion broken away to reveal the counterweight.

FIG. 2 is an enlarged fragmentary detail view taken approximately on the plane of the irregular line 2—2 of FIG. 1 looking in the direction of the arrows.

And FIG. 3 shows a view in perspective the purpose of which is to reveal the general nature of the aforementioned dual panel case or jacket and the two outside and inside folders with blank lines and columns for reception of the aforementioned addresses and table of international air rates (not detailed).

With reference first to the illustration of the device as depicted in FIG. 3 it will be noted that broadly construed the pocket-size rectangular or equivalent case at the left is designated as a jacket A. The added address folder is denoted at B and is used in conjunction with a correspondingly constructed inward folder C.

With reference first to the component part which is here designated as the jacket A, it will be noted that it is preferably made from sheet material and is generally rectangular in over-all appearance and experimental models have been made up from cardboard but appropriate plastic material can, of course, be used. The first rectangular panel also designated as the front panel is denoted by the numeral 6 and it comprises (FIG. 1) a left hand half-portion 8 and a right hand half-portion 10. The second or rearward panel complements the panel 6 and the two panels are joined together to provide a fold line as at 12 and a suitable connection along the edges as generally designated at 14 in FIG. 3. A metal insert or plate 16 is sandwiched between the respective right hand half-portions of the two panels 6 and 7. A closing and retaining flap is struck-out from the rear panel 7 to provide a tongue 17 which serves in a manner to be hereinafter desscribed. These two panels are assembled and appropriately joined by a centralized hollow flanged rivet 18 (FIG. 2) which has the additional function of mounting a manually turnable selector dial 20. This dial as best shown in FIG. 1 has its viewable face divided by radial lines in a manner to define segmental zones 22 and 24 (FIG. 1) and similar zones 26 and 28. The zone 22 has indicia printed thereon and its use pertains to domestic regular or surface rates. The sector or zone to the right has to do with foreign surface rates, the zone 26 has to do with domestic air rates and the zone 28 with foreign air rates all as is evident, it is believed, from the legends seen in FIG. 1. There is a triangular area or zone and this has wording therein which suggests its use as a point of support. The apical outer end of this zone registers with a keeper notch 30 which in practice is adapted to seat a point of a pencil, a pointed ball point pen or similar hand held implement. In the corner portion of each zone a sight opening is provided and to avoid needless repetition. Each sight opening or window is denoted by the numeral 32. These sight openings when brought into play register, depending on the position of the dial 20, with printed numerals which are printed on the surface of the half-portion 8 and which show the rates for the various zones in cents. One such designation at the right in FIG. 1 is conveniently denoted at 34 and represents "50 cents."

Continuing with the dial and its purpose it will be seen that the notched marginal edge is adjustable and cooperable with the arcuate scale. This scale comprises a row of graduations to the left of which (FIG. 1) numbers are used to represent an ounce scale ranging from one half ounce to four ounces. To the right of the graduations or calibrations punched holes are provided. These holes are punched through both panels 6 and 7 and the half ounce hole is denoted by the numeral 36 (FIG. 3), the four ounce hole at 38 and the intervening ones, generally stated, at 40. The manner in which the thus constructed dial 20 cooperates with the graduated or calibrated scale and the manner in which the windows cooperate with the indications 34 will be referred to later.

Referring now to the lower left hand corner in FIG. 1 it will be seen that the main or front panel 6 is provided with a straight marker which is denoted by the numeral 42 and to the left of which appears the word "over" at 44 and to the right of which appears the word "under" as at 46. The pendulous-like means comprises a flexible cord or string 48 the lower end portion 50 of which is provided with a suitable clip 52 for the attachment thereto of the letter or other mailable article 54. The extreme upper end of the cord is anchored as at 56 in registry with the line 42 so that the median portion of the cord is permitted to register when it is in a plumb position with the marker 42. If in handling the device the tilt of the jacket moves the word over in general registry with the cord and suspended letter it will be seen that the user can determine by properly operating the dial the proper postage established for the matter at hand. By the same token if the word under comes into use in conjunction with the cord the correct postage requirements will be evident to the experienced user.

Stated briefly, the best manner of handling the device is to attach and fasten the letter or other mailable article 54 to the cord suspended clip 52. Next the manually regulable tell-tale dial 20 is brought into play by seating the point of a hand-held pencil, ball point pin or like pointed instrument in the aforementioned keeper notch 30 and loosely pressing the point through a selected pair of holes 36, 38, or 40 as the case may be and in line with the letter weight designating scale graduations ranging from one half ounce to four ounces more or less. The holes serve as bearings and the point of the instrument becomes a journal on which the over-all case or jacket means is suspended and is allowed to fulcrum to the right or left as the case may be. The weighted suspending cord remains in a substantially perpendicular or plumb position. The index or indicator mark 42 switches or moves to the left or right of the suspended cord and the companion printed matter legends indicate whether the result compared to the aforementioned weight designating indicia is over or under as the case may be. The coordinating sight openings 32 or windows now come into play and the required postage shows through such as 8 cents, 10 cents, 20 cents and so on.

The optional folders B and C are preferably made up of two folds hinged together as at 58 and 60. The folder C is preferably made of light paper and the interior surfaces of the folds are provided with lines and columns which are properly filled in with addresses most used and with a table of international air rates alphabetically or otherwise arranged. The fold 62 is provided with a keeper slot 64 to accommodate the tongue 16 when the over-all component parts are folded together to provide the package-like jacket readied for use as shown in FIG. 2.

In actual practice the columnized lines which are shown blank for example in FIG. 3 will have printed therein preferably in alphabetical order the names of countries such as Australia 25 cents, Austria 20 cents, Belgium 20 cents, Bulgaria 20 cents and so on. While air mail service is available to practically all foreign nations the ones most used will be listed in the chart suggested and the rates will be based on a half ounce principle unless otherwise indicated. Manifestly, there are so many facets to the handling of mail, domestic and foreign, and by regular rates and air rates, it would seem to be unnecessary to dwell upon this somewhat printed matter aspect of the over-all concept. For this reason it will be evident that the component parts designated heretofore as folders and made up of two leaves B and C are added features. The essence of the invention has to do with the packet-like case or jacket and its half-portions 8 and 10, the weight means in the half-portion 10 and the dial, scale and designating and pendulum means cooperable with the left hand half-portion 8 in FIG. 1.

What is claimed as new is as follows:

1. A portable pocket-size letter suspending, weighing and postage computing device comprising, in combination, an elongate jacket adapted to serve as a supporting and balancing beam and embodying a first panel constituting a front panel and a second panel opposed and complemental with said first panel and providing a rear backing panel, a counterweight interposed and fastened between said panels and confined to a locale constituting one half-portion of said jacket, a tilt indicating marker located adjacent a lower corner portion of the other half-portion of said jacket and providing an index, said marker being provided to the left thereof with the word "over" and to the right thereof with the word "under," a flexible suspension cord having an upper end anchored on said panels directly in line with said indicating marker and a median portion capable of assuming a first position registrable with said indicaitng marker, said suspension cord median portion being cooperable to the left and right in a pendulum-like manner to coact with the above "over" and "under" designations, said suspension cord also having a free lower end hanging below the bottom of said jacket and provided with a letter attaching and weighing clip, an area of the face of said other half-portion having calibrations arranged and providing a calibrated weighing scale, and a manually positionable calculating dial mounted for adjustable rotation on said face and having a marginal point-of-support notch which is selectively registrable with the calibrations embodied in said weighing scale.

2. The weighing and computing device defined in and according to claim 1, and wherein the scale is presented in a locale bordering a limited marginal edge of the dial and made up of a systematic row of graduations designated by accompanying numbers ranging, for example, from one half ounce to four ounces, each graduation having aligned bearing holes for temporary reception and retention of an insertable and removable jacket supporting and journaling member such as the point of a pencil or the like when the latter has been lined up with and seated in said notch.

3. The weighing and computing device defined in and according to claim 2, and wherein the readable face of said dial is divided into circumferentially spaced sectors each having a sight opening within its confines, said sight opening defining a rate finding window, and that surface of the front panel directly underneath of said dial having cents per ounce (or fractions thereof) rate designating numbers with which said windows register in keeping with the coaction of said notch with the applicable scale graduations and numbers.

4. The weighing and computing device defined in and according to claim 3 and wherein said sectors are identifiable as Domestic Surface Rates, Foreign Surface Rates, Domestic Air Rates and Foreign Air Rates, respectively.

5. The weighing and computing device defined in and according to claim 4, and wherein the respective windows, identifying indicia and rate designating numbers are orderly and systematically coordinated to achieve the predetermined step-by-step results desired.

6. The weighing and computing device defined in and according to claim 5, and wherein a prescribed area of the face of said dial is provided with a marked triangulate zone which is designated Point-Of-Support and has an outward apical end permanently aligned with the aforementioned keeper notch.

7. The weighing and computing device of claim 2, and wherein said panels are made of cardboard and resemble back-to-back postal cards, said first panel being provided along one marginal edge with an outward folder having an interior directory-type surface columnized and usable for addresses that are most often used.

8. The weighing and computing device of claim 2, and wherein said panels are made of cardboard and resemble back-to-back postal cards, said first panel being provided along one marginal edge with an outward folder having an interior directory-type surface columnized and usable for addresses that are most often used, and being also provided with a similar inward folder facing and lining said outward folder and having a lined and columnized surface with printed names of foreign countries alphabetically tabulated and with international air rates orderly presented.

9. A portable pocket-size letter suspending, weighing and postage computing device comprising an elongate jacket serving as a supporting and balancing beam and embodying at least one rectangular card-like flat-faced panel having a left hand half-portion and a right hand half-portion, the latter half-portion provided with a counterbalancing weight, the left hand half-portion having a lower corner provided with a prominent line constituting a beam tilting marker provided to its left with the word "over" and to its right with the word "under," pendulum-like letter suspending means comprising a length of flexible cord having an upper end anchored on said panel in alignment with the aforementioned marker line, having a median portion registrable with said line and a lower end portion depending below a marginal edge of the jacket and having a clip for the attachment thereto of a readily attachable and detachable letter or other mailable article, a manually turnable dial mounted for rotation on an obverse face of said panel, said dial having a marginal keeper notch, circumferentially spaced sight openings providing windows, said windows being registrable with rate specifying numbers provided therefor on a cooperating portion of the face of said panel, and arcuate scale means provided on the face of said panel and cooperable with the marginal edge of said dial and particularly said notch.

10. The weighing and computing devict defined in and according to claim 9, said means comprising a row of spaced calibrations provided along one side with numbers indicating in ounces a measuring scale and provided to an opposite side of said graduations with a row of arcuate holes, said holes being registrable with said notch and said notch and holes serving to accommodate a pointed end of a suspending and balancing pencil when it is desired to weigh the letter, to establish the weight by way of the scale media and to ascertain correct postage depending on the position of the dial, notch and windows.

References Cited

UNITED STATES PATENTS

| | | | |
|---|---|---|---|
| 193,744 | 7/1877 | Wyckoff | 177—127 |
| 668,349 | 2/1901 | Eschemann | 177—126 |
| 776,880 | 12/1904 | Allen | 177—250 |
| 1,511,404 | 10/1924 | Fiedler | 177—251 XR |
| 2,507,073 | 5/1950 | White | 177—251 |

ROBERT S. WARD, JR., Primary Examiner.

U.S. Cl. X.R.

177—235, 251